(12) United States Patent
Poggenpohl

(10) Patent No.: US 8,814,196 B1
(45) Date of Patent: Aug. 26, 2014

(54) SHOWER TRANSFER ASSISTANCE SCOOTER DEVICE

(71) Applicant: Steven K. Poggenpohl, Evans, CO (US)

(72) Inventor: Steven K. Poggenpohl, Evans, CO (US)

(*) Notice: Subject to any disclaimer, the term of this patent is extended or adjusted under 35 U.S.C. 154(b) by 0 days.

(21) Appl. No.: 13/769,986

(22) Filed: Feb. 19, 2013

(51) Int. Cl.
  *A61G 5/04* (2013.01)
  *B62K 5/025* (2013.01)
  *B62J 1/28* (2006.01)
  *B62K 21/12* (2006.01)
  *B62K 5/023* (2013.01)
  *A61G 5/10* (2006.01)

(52) U.S. Cl.
  CPC . *B62K 5/025* (2013.01); *B62J 1/28* (2013.01); *B62K 21/12* (2013.01); *B62K 5/023* (2013.01); *A61G 5/04* (2013.01); *A61G 5/1072* (2013.01); *Y10S 180/907* (2013.01)
  USPC ............... 280/304.1; 180/907; 296/65.04; 280/250.1

(58) Field of Classification Search
  CPC ......... A61G 5/1072; A61G 5/00; A61G 5/04; A61G 2005/00; A61G 2005/04; B62K 5/023; B62K 5/025
  USPC ............... 180/907; 280/250.1; 296/65.04
  See application file for complete search history.

(56) References Cited

U.S. PATENT DOCUMENTS

| | | | |
|---|---|---|---|
| 2,572,149 A * | 10/1951 | Hind et al. .................... 280/290 |
| 3,662,409 A | 5/1972 | Johansson |
| D287,836 S | 1/1987 | Chan et al. |
| 4,846,295 A * | 7/1989 | Shepard et al. .............. 180/68.5 |
| 4,927,167 A * | 5/1990 | Davis .......................... 280/250.1 |
| 4,951,766 A * | 8/1990 | Basedow et al. ............... 180/6.5 |
| 4,998,305 A | 3/1991 | Davis |
| D397,645 S | 9/1998 | Schaffner |
| 6,095,269 A * | 8/2000 | Hosaka et al. ............... 180/65.6 |
| 6,196,630 B1 * | 3/2001 | Cheng ....................... 297/344.22 |
| 6,375,209 B1 * | 4/2002 | Schlangen ................. 280/250.1 |
| 6,623,022 B2 | 9/2003 | Malassigne et al. |
| 6,684,969 B1 * | 2/2004 | Flowers et al. .............. 180/65.1 |
| 6,699,616 B2 * | 3/2004 | Wu .................................. 429/98 |
| 6,974,142 B1 * | 12/2005 | Shikinami et al. ......... 280/250.1 |
| 7,107,630 B2 | 9/2006 | Noro et al. |
| 7,124,849 B2 * | 10/2006 | Huang .......................... 180/208 |
| 7,950,673 B2 * | 5/2011 | Reed et al. .................. 280/5.22 |
| 7,980,584 B2 | 7/2011 | Goldstein |
| 2002/0148663 A1 * | 10/2002 | Chang .......................... 180/210 |
| 2007/0000714 A1 * | 1/2007 | Lin .............................. 180/311 |
| 2008/0111338 A1 | 5/2008 | Ilan |
| 2009/0095547 A1 * | 4/2009 | Swett et al. ................. 180/65.1 |

FOREIGN PATENT DOCUMENTS

WO     WO 9301788 A1 * 2/1993

* cited by examiner

*Primary Examiner* — James English

(57) ABSTRACT

A shower assistance scooter device supports a person in a bathing facility. The device includes a base and a seat coupled to and extending upwardly from the base. The seat is rotationally coupled to the base. A handle assembly is coupled to the base and positioned adjacent to a front side of the base. The handle assembly is rotatable relative to the base. A plurality of wheels is coupled to the base including at least one drive wheel and a directional wheel coupled to the handle assembly for steering the device. A first front foot rest is coupled to the base adjacent to a front side of the base. The base, seat, handle assembly, wheels, and first front foot rest are each water resistant to support a person in a bathing facility while the person bathes.

17 Claims, 4 Drawing Sheets

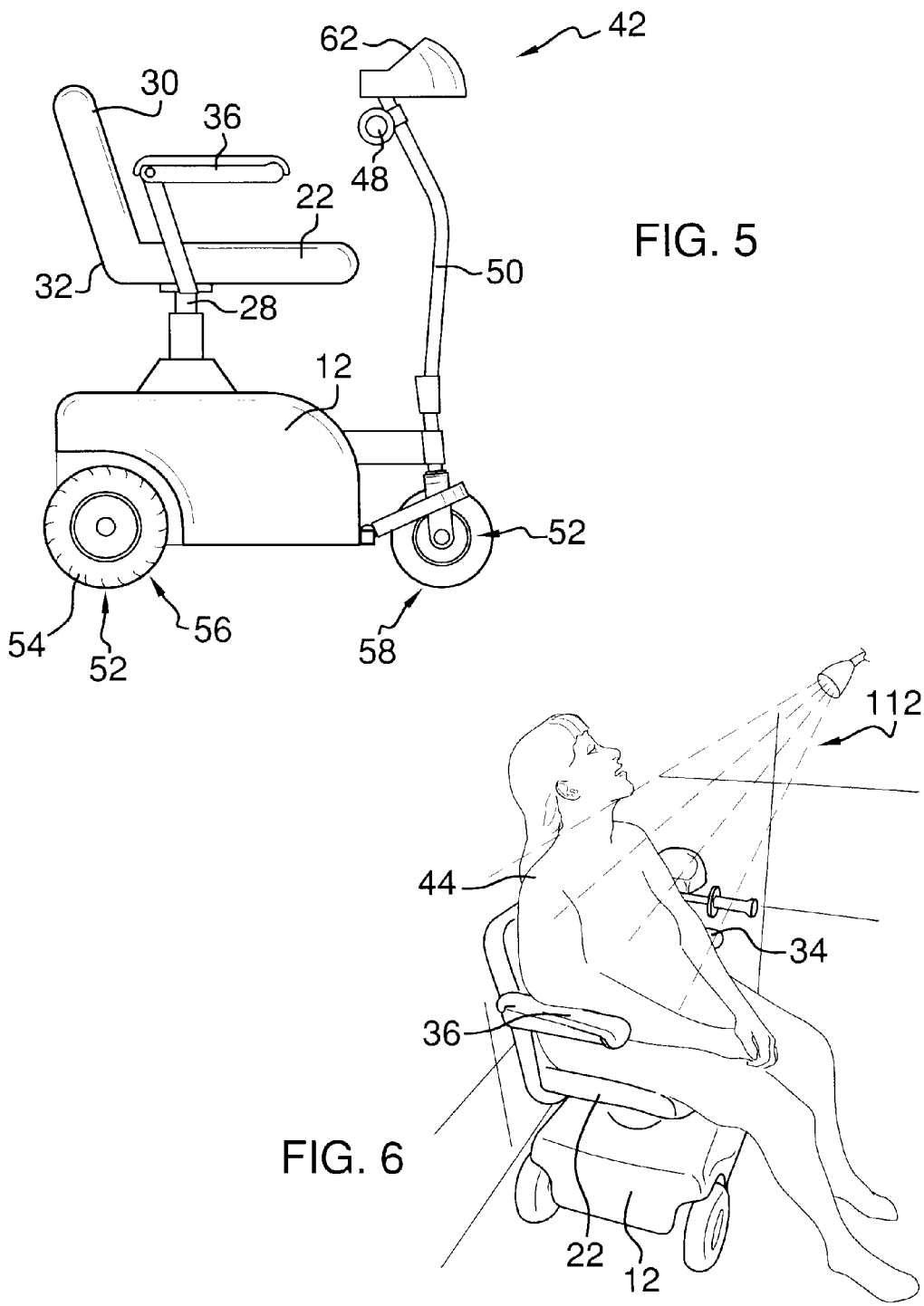

SHOWER TRANSFER ASSISTANCE SCOOTER DEVICE

BACKGROUND OF THE DISCLOSURE

Field of the Disclosure

The disclosure relates to scooter devices and more particularly pertains to a new scooter device for assisting a disabled person to transfer from a scooter into a shower facility.

SUMMARY OF THE DISCLOSURE

An embodiment of the disclosure meets the needs presented above by generally comprising a base having a top side, a pair of lateral sides, and a front side extending between the lateral sides. A seat is coupled to and extends upwardly from the base. The seat is rotationally coupled to the base. A handle assembly is coupled to the base and positioned adjacent to the front side of the base. The handle assembly is rotatable relative to the base. A plurality of wheels is coupled to the base including at least one drive wheel a directional wheel coupled to the handle assembly for steering the device. A first front foot rest is pivotally coupled to the base and is pivotable between a forward position and a side position. The base, seat, handle assembly, wheels, and first front foot rest are each water resistant to support a person in a bathing facility while the person bathes.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 5 is a side view of an embodiment of the disclosure.

FIG. 6 is a top back side view of an embodiment of the disclosure in use.

DESCRIPTION OF THE PREFERRED EMBODIMENT

Figure 1:
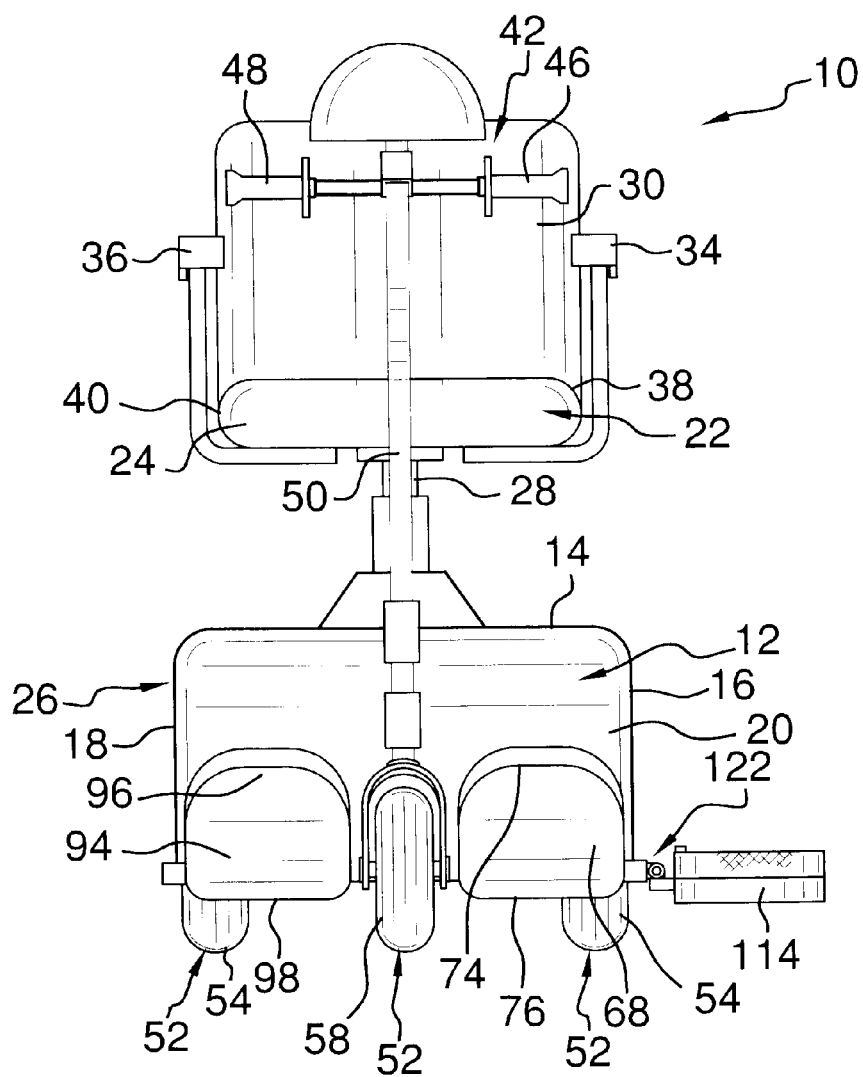
FIG. 1 is a front view of a shower assistance scooter device according to an embodiment of the disclosure.
Figure 2:
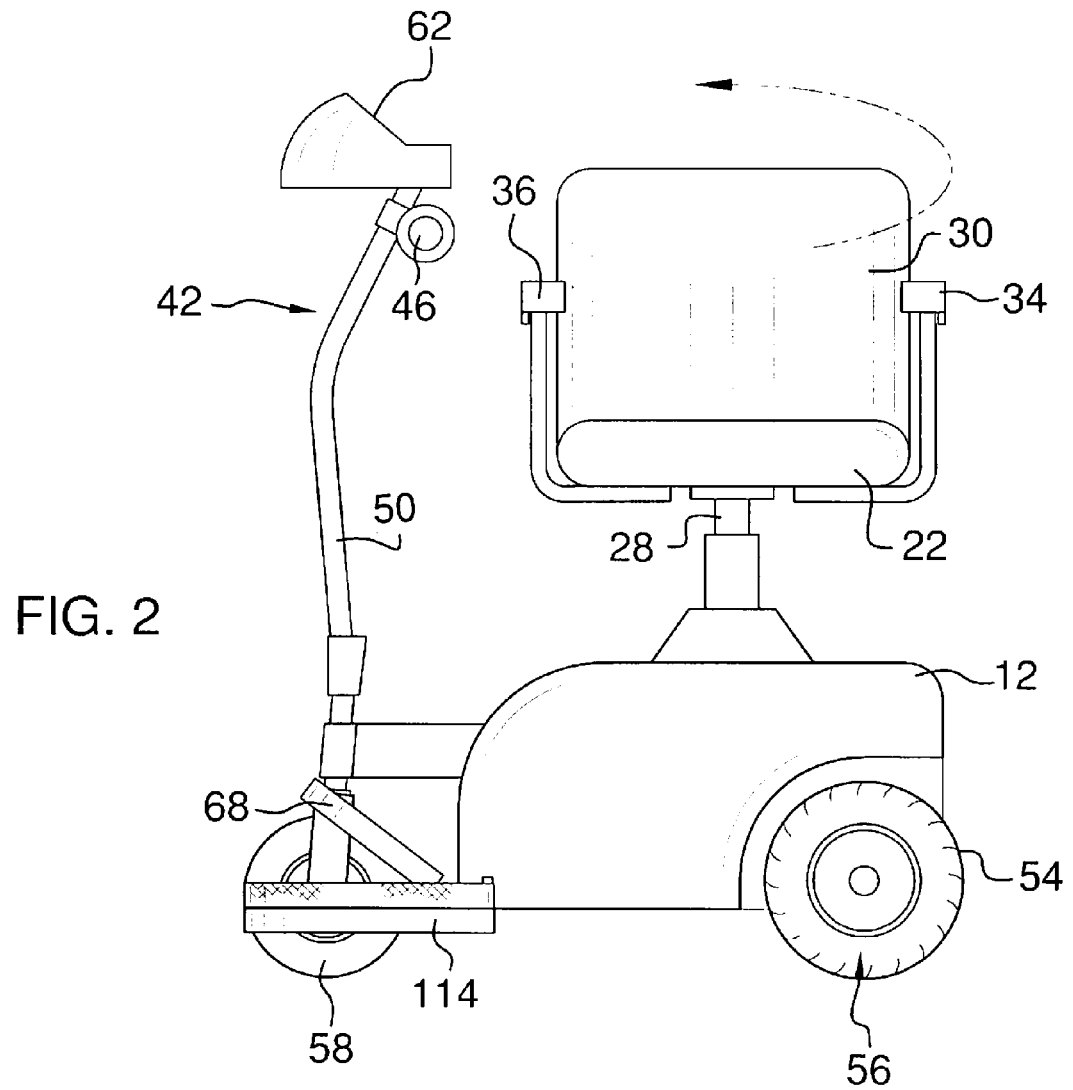
FIG. 2 is a side view of an embodiment of the disclosure.
Figure 3:
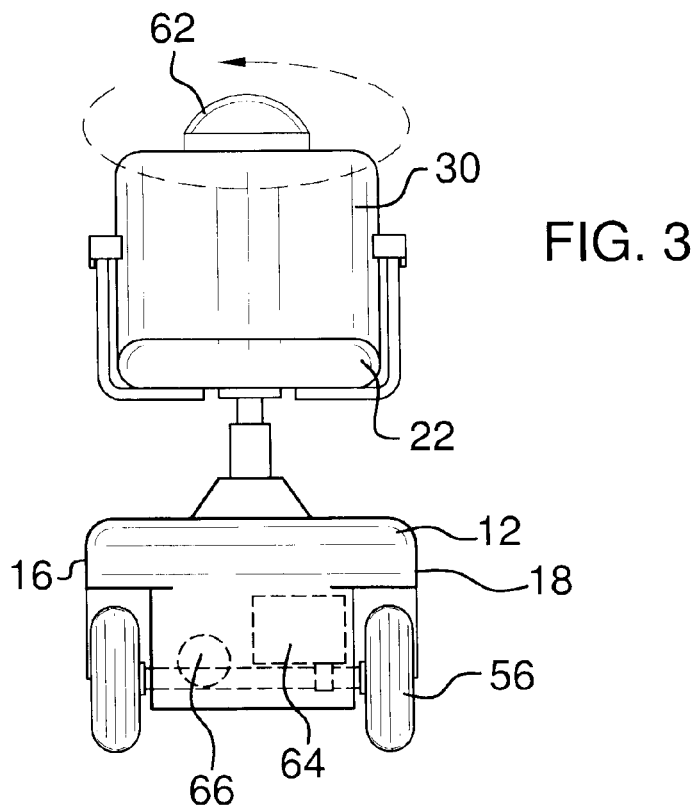
FIG. 3 is a back view of an embodiment of the disclosure.
Figure 4:
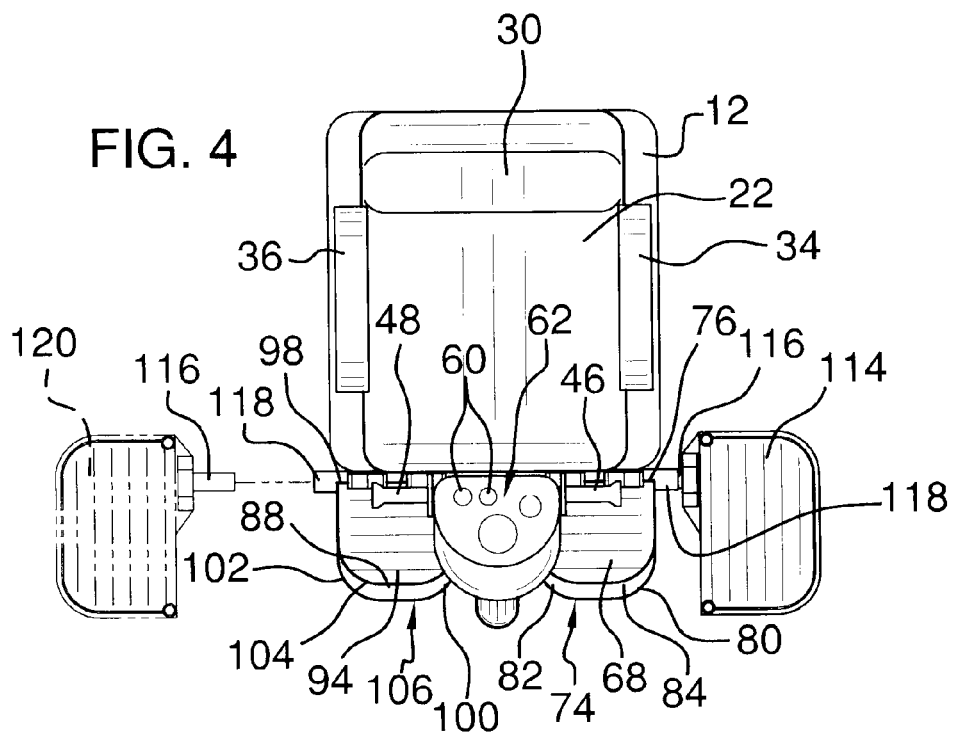
FIG. 4 is a top view of an embodiment of the disclosure.

With reference now to the drawings, and in particular to FIGS. 1 through 6 thereof, a new scooter device embodying the principles and concepts of an embodiment of the disclosure and generally designated by the reference numeral 10 will be described.

As best illustrated in FIGS. 1 through 6, the shower assistance scooter device 10 generally comprises a base 12 having a top side 14, a pair of lateral sides 16,18 and a front side 20 extending between the lateral sides 16,18. A seat 22 is coupled to and extends upwardly from the base 12. The seat 22 is rotationally coupled to the base 12 wherein the seat 22 may be selectively rotated relative to the base 12. An outer perimeter 24 of the seat 22 is inwardly vertically offset from an outer perimeter 26 of the base 12. Thus, the seat 22 is fully positioned over the base 12 to provide a compact configuration. The seat 22 may be rotatable a full three hundred sixty degrees relative to a shaft 28 coupling the seat 22 to the base 12. The shaft 28 extends transversely from the top side 14 of the base 12. A substantially vertical back rest 30 is coupled to and extends upwardly from a back edge 32 of the seat 22. A pair of arm rests 34,36 may be provided. Each arm rest 34,36 is coupled to the seat 22 substantially aligned with a respective lateral side 38,40 of the seat 22. The seat 22, back rest 30, and arm rests 34,36 are designed to support a person 44.

A handle assembly 42 is coupled to the base 12. The handle assembly 42 is positioned adjacent to the front side 20 of the base 12 to be accessible to the person 44 while supported on the seat 22 and facing forward. The handle assembly 42 may include handles 46,48 extending transversely from an elongated central substantially vertical handle shaft 50 which is rotatable relative to the base 12. A plurality of wheels 52 is coupled to the base 12. The plurality of wheels 52 includes a pair of rear wheels 54. Each of the rear wheels 54 is inset relative to the outer perimeter 26 of the base 12 to maintain a compact configuration. The wheels 52 further include at least one drive wheel 56 coupled to the base 12. The drive wheel 56 may be one or both of the rear wheels 54. The plurality of wheels 52 includes a directional wheel 58 coupled to the handle assembly 42 wherein the directional wheel 58 is turned to a desired position by manipulation of the handles 46,48. Thus, the base 12 is moved and steered as desired by the person 44 or another person standing near the base 12. The handle assembly 42 further includes controls 60 which may be on a dedicated control panel 62 or incorporated into the handles 46,48 for operating the drive wheel 56. A motor 64 is coupled to and positioned in the base 12 wherein the motor 64 is prevented from contacting water by the base 12. The motor 64 is operationally coupled to the drive wheel 56 and the controls 60. A battery 66 is coupled to and positioned in the base 12 wherein the battery 66 is prevented from contacting water by the base 12. The battery 66 is electrically coupled to the motor 64 and the controls 60.

A first front foot rest 68 is pivotally coupled to the base 12. The first front foot rest 68 is positioned at an angle relative to the base 12 such that a front side 74 is positioned higher than a back side 76 of the first front foot rest 68 for comfort supporting a foot of the person 44. Forward corners 80,82 of the first front foot rest 68 may be curved, particularly the corner 80 on the outer side of the first front foot rest 68. Thus, the first front foot rest 68 is configured to prevent catching against nearby structures or objects as the base 12 is maneuvered. A first toe guard 84 may be coupled to and extend around forward 88 and lateral side edges 90,92 of the first front foot rest 68. A similarly structured second front foot rest 94 may be pivotally coupled to the base 12. The second front foot rest 94 is also angled relative to the base 12 such that a front side 96 is positioned higher than a back side 98 of the second front foot rest 94. Forward corners 100,102 of the second front foot rest 94 are also curved. Each of the first and second front foot rests 68,94 is coupled to the base 12 on opposite sides of the elongated handle shaft 50. A second toe guard 104 may be coupled to and extend around forward 106 and lateral side edges 108,110 of the second front foot rest 94. Each foot rest 68,94 is also removably detachable from the base 12 if so desired.

A first side foot rest 114 is removably coupled to the base 12 by inserting a shaft 116 extending from the first side foot rest 114 into a socket 118 coupled to the base 12. Similarly, a second side foot rest 120 may be removably coupled to the base 12 on a side of the base 12 opposite the first side foot rest 114 in a similar manner. Each of the first side foot rest 114 and the second side foot rest 120 may incorporate a toe guard and curved edges similar to the structure of the front foot rests 68,94. Each side foot rest 114,120 may also be pivotally coupled to the base 12 using a pivot joint 122.

The base 12, the seat 22, the back rest 30, the arm rests 34,36, the handle assembly 42, the wheels 54, and the first and second front foot rests 68,94 are each water resistant wherein the device 10 is configured to support the person 44 in a bathing facility such as a shower while the person 44 bathes or is bathed by another.

In use, the device 10 facilitates moving the person 44 into and out of a bathing facility 112 which typically has a narrow entry portal. This is particularly useful when the person 44 is injured or disabled such that the person 44 is incapable of supporting themselves and would previously have to transfer from a personal vehicle or scooter to a bench in a bathing facility in order to bathe. The device 10 is operable by the person 44 and may be sufficiently waterproof to obviate transfer of the person 44 between supporting objects. Thus, the person 44 can maintain greater privacy and dignity as opposed to relying on another person for support to safely bathe.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A shower assistance scooter device comprising:
   a base having a top side, a pair of lateral sides, and a front side extending between said lateral sides;
   a seat coupled to and extending upwardly from said base, said seat being rotationally coupled to said base wherein said seat is selectively rotated relative to said base;
   a handle assembly coupled to said base, said handle assembly being positioned adjacent to said front side of said base, said handle assembly being rotatable relative to said base;
   a plurality of wheels coupled to said base, said wheels including a drive wheel coupled to said base and a directional wheel coupled to said handle assembly wherein said directional wheel is turned to a desired position by manipulation of said handle assembly;
   a first front foot rest coupled to said base, said first front foot rest being in a forward position adjacent to said front side of said base; and
   wherein said base, said seat, said handle assembly, said wheels, and said first front foot rest are each water resistant wherein said device is configured to support a person in a bathing facility while the person bathes.

2. The device of claim 1, further comprising a toe guard coupled to and extending around forward and lateral side edges of said first front foot rest.

3. The device of claim 1, further comprising forward corners of said first front foot rest being curved.

4. The device of claim 1, further comprising said seat being rotatable a full three hundred sixty degrees relative to a shaft coupling said seat to said base, said shaft extending transversely from said top side of said base.

5. The device of claim 1, further comprising a motor coupled to and positioned in said base wherein said motor is prevented from contacting water by said base, said motor being operationally coupled to said drive wheel.

6. The device of claim 5, further comprising a battery coupled to and positioned in said base wherein said battery is prevented from contacting water by said base, said battery being electrically coupled to said motor.

7. The device of claim 1, further comprising said first front foot rest being angled relative to said base wherein a front side of said first front foot rest is positioned higher than a back side of said first front foot rest.

8. The device of claim 1, further comprising a pair of arm rests, each arm rest being coupled to said seat, each arm rest being substantially aligned with a respective lateral side of said seat.

9. The device of claim 1, further comprising a back rest coupled to and extending upwardly from a back edge of said seat.

10. The device of claim 1, further comprising a second front foot rest coupled to said base, said second front foot rest being water resistant.

11. The device of claim 10, further comprising each of said first and second front foot rests being coupled to said base on opposite sides of said handle assembly.

12. The device of claim 1, further comprising an outer perimeter of said seat being inwardly vertically offset from an outer perimeter of said base wherein said seat is fully positioned over said base.

13. The device of claim 1, further comprising said plurality of wheels including a pair of rear wheels, each of said rear wheel being inset relative to an outer perimeter of said base.

14. The device of claim 13, further comprising said drive wheel being one of said rear wheels.

15. A shower assistance scooter device comprising:
   a base having a top side, a pair of lateral sides, and a front side extending between said lateral sides;
   a seat coupled to and extending upwardly from said base, said seat being rotationally coupled to said base wherein said seat is selectively rotated relative to said base;
   a handle assembly coupled to said base, said handle assembly being positioned adjacent to said front side of said base, said handle assembly being rotatable relative to said base;
   a plurality of wheels coupled to said base, said wheels including a drive wheel coupled to said base and a directional wheel coupled to said handle assembly wherein said directional wheel is turned to a desired position by manipulation of said handle assembly;
   a first front foot rest coupled to said base, said first front foot rest being in a forward position adjacent to said front side of said base;
   wherein said base, said seat, said handle assembly, said wheels, and said first front foot rest are each water resistant wherein said device is configured to support a person in a bathing facility while the person bathes; and a first side foot rest being removably coupled to said base, said first side foot rest being in a side position adjacent to an associated one of said lateral sides of said base.

16. The device of claim 15, further comprising a second side foot rest being removably coupled to said base, said second side foot rest being in a side position adjacent to an associated one of said lateral sides of said base opposite said first side foot rest.

17. A shower assistance scooter device comprising:
- a base having a top side, a pair of lateral sides, and a front side extending between said lateral sides;
- a seat coupled to and extending upwardly from said base, said seat being rotationally coupled to said base wherein said seat is selectively rotated relative to said base, an outer perimeter of said seat being inwardly vertically offset from an outer perimeter of said base wherein said seat is fully positioned over said base, said seat being rotatable a full three hundred sixty degrees relative to a shaft coupling said seat to said base, said shaft extending transversely from said top side of said base;
- a back rest coupled to and extending upwardly from a back edge of said seat;
- a pair of arm rests, each arm rest being coupled to said seat, each arm rest being substantially aligned with a respective lateral side of said seat;
- a handle assembly coupled to said base, said handle assembly being positioned adjacent to said front side of said base, said handle assembly being rotatable relative to said base;
- a plurality of wheels coupled to said base, said plurality of wheels including a pair of rear wheels, each of said rear wheel being inset relative to an outer perimeter of said base, said wheels including a drive wheel coupled to said base, said drive wheel being one of said rear wheels, said plurality of wheels including a directional wheel coupled to said handle assembly wherein said directional wheel is turned to a desired position by manipulation of said handle assembly;
- a first front foot rest coupled to said base, said first front foot rest being positioned adjacent to said front side of said base, said first front foot rest being angled relative to said base wherein a front side of said first front foot rest is positioned higher than a back side of said first front foot rest, forward corners of said first front foot rest being curved;
- a first toe guard coupled to and extending around forward and lateral side edges of said first front foot rest;
- a second front foot rest coupled to said base, said second front foot rest being positioned adjacent to said front side of said base, said second front foot rest being angled relative to said base wherein a front side of said second front foot rest is positioned higher than a back side of said second front foot rest, forward corners of said second front foot rest being curved, each of said first and second front foot rests being coupled to said base on opposite sides of said handle assembly;
- a second toe guard coupled to and extending around forward and lateral side edges of said second front foot rest;
- a first side foot rest being removably coupled to said base, said first side foot rest being in a side position adjacent to an associated one of said lateral sides of said base;
- a second side foot rest being removably coupled to said base, said second side foot rest being in a side position adjacent to an associated one of said lateral sides of said base opposite said first side foot rest;
- wherein said base, said seat, said back rest, said arm rests, said handle assembly, said wheels, and said first and second front foot rests are each water resistant wherein said device is configured to support a person in a bathing facility while the person bathes;
- a motor coupled to and positioned in said base wherein said motor is prevented from contacting water by said base, said motor being operationally coupled to said drive wheel; and
- a battery coupled to and positioned in said base wherein said battery is prevented from contacting water by said base, said battery being electrically coupled to said motor.

* * * * *